United States Patent
Abad Peiro et al.

(10) Patent No.: US 7,570,401 B2
(45) Date of Patent: Aug. 4, 2009

(54) PROOFING METHOD AND APPARATUS THAT SELECTS THE KIND OF MEDIA TYPE AND TRANSFORMATION OF THE INPUT COLOR GAMUT BASED ON THE OUTPUT DEVICE AND THE RESULTS OF COMPARISON WITH A SCANNED IMAGE USING A SPECTROPHOTOMETER

(75) Inventors: Jose Abad Peiro, Barcelona (ES); Oscar Martinez, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 417 days.

(21) Appl. No.: 11/491,129

(22) Filed: Jul. 24, 2006

(65) Prior Publication Data

US 2007/0097412 A1    May 3, 2007

(30) Foreign Application Priority Data

Oct. 28, 2005    (GB)    .................................. 0521971.2

(51) Int. Cl.
*H04N 1/46* (2006.01)
*G03F 3/08* (2006.01)

(52) U.S. Cl. .................... 358/504; 358/1.9; 358/518

(58) Field of Classification Search .................. 358/1.9, 358/1.11–1.18, 504, 518; 382/167
See application file for complete search history.

(56) References Cited

U.S. PATENT DOCUMENTS

| | | | | | |
|---|---|---|---|---|---|
| 5,491,568 | A | * | 2/1996 | Wan | ............................ 358/518 |
| 5,508,826 | A | * | 4/1996 | Lloyd et al. | .................. 358/501 |
| 5,852,462 | A | * | 12/1998 | Lloyd et al. | .................. 347/156 |
| 6,008,907 | A | * | 12/1999 | Vigneau et al. | ............... 358/1.9 |
| 6,151,136 | A | * | 11/2000 | Takemoto | ..................... 358/1.9 |
| 6,205,244 | B1 | * | 3/2001 | Bawolek et al. | .............. 382/162 |
| 7,069,164 | B2 | * | 6/2006 | Viturro et al. | ................... 702/85 |
| 7,298,526 | B2 | * | 11/2007 | Bailey | .......................... 358/1.9 |
| 7,307,752 | B1 | * | 12/2007 | Mestha et al. | ................. 358/1.9 |
| 2002/0080373 | A1 | * | 6/2002 | Collette et al. | ............... 358/1.9 |
| 2002/0186389 | A1 | * | 12/2002 | Muramoto | ................... 358/1.9 |
| 2003/0034983 | A1 | | 2/2003 | Muramoto | |
| 2004/0004731 | A1 | * | 1/2004 | Itagaki | ........................ 358/1.9 |
| 2004/0150848 | A1 | * | 8/2004 | Delang et al. | ................. 358/1.9 |
| 2005/0052668 | A1 | * | 3/2005 | Hoshino | ...................... 358/1.9 |
| 2005/0275854 | A1 | * | 12/2005 | Bailey | .......................... 358/1.9 |

* cited by examiner

*Primary Examiner*—Benny Q Tieu
*Assistant Examiner*—Christopher W Mutz

(57) ABSTRACT

A method of and apparatus for producing a validated print-out. The method includes creating a modified virtual image which includes the data from the original virtual image and a virtual original series of color patches representative of a color gamut. A printed series of the color patches representative of the color gamut using a spectrophotometer to provide a spectrophotometer output is scanned. The spectrophotometer output is analyzed using the processor to compare the output to an admissible range stored in a memory. If the output is within the admissible range, the print-out of the modified virtual image is validated. If the output is outside of the admissible range, the print-out of the modified virtual image is either validated after an analysis of the position of the data points of the modified virtual image in relation to an admissible color gamut, or the modified virtual image is changed.

19 Claims, 3 Drawing Sheets

PROOFING METHOD AND APPARATUS THAT SELECTS THE KIND OF MEDIA TYPE AND TRANSFORMATION OF THE INPUT COLOR GAMUT BASED ON THE OUTPUT DEVICE AND THE RESULTS OF COMPARISON WITH A SCANNED IMAGE USING A SPECTROPHOTOMETER

This application claims priority from Great Britain patent application 0521971.2, filed on Oct. 28, 2005. The entire content of the aforementioned application is incorporated herein by reference.

FIELD OF THE INVENTION

The invention relates to the field of proofing of a print, and more particularly to the field of press proofing.

BACKGROUND OF THE INVENTION

A print may be obtained in various ways, depending for example on the number of prints desired. When a relatively small number of prints are required, the prints are normally obtained using a printer having a printhead based on thermal or piezo such ink jet technology. When a relatively large number of prints are required, the prints are normally obtained using a printing press. It should be noted that the set up of a press for a print is a relatively expensive operation, which implies that there is virtually no possibility of making trials using the press. When using a printer, there is a possibility to make trials without incurring into high costs. Ideally, for printing a large number of prints, trials should be made with a proofing device or printer while the actual final prints should be provided by a printing press. It should however be noted that the printer and the printing press are different systems each having their own specific characteristics, so that there is no guaranty, and most often it is not expected the aspect of a print obtained with a printer using a specific data file to match the aspect of a print obtained with a printing press using the same specific data file. It is however a commercial practice to prepare a so called "proof print" using a printer before running the same final job into a printing press, whereby the proof print is normally a representation of the final result as close as possible as the one which will be obtained by using a printing press. Synonyms of "proof print" may be "printed proof", "hardware proof" or "proof of print". A customer will agree to purchase press printing services based on a proof print which is actually not produced by the printing press. In technical terms, a specific printer may print a number of colors, all of these colors defining the gamut of the printer concerned, the gamut being typically represented as a group of points in a color space. Clearly, there are a number of color values which a printer cannot reproduce, which are part of the destination color space, i.e., the color space of the final device whose behaviour we are trying to emulate, but are not reachable by the printer concerned due to its intrinsic limitations. Similarly, a specific press also has its own color gamut. Again, there are a number of colors which a press cannot print, whereby these colors are not part of the color gamut of the printing press. If a specific printer color gamut and a specific press gamut are considered, any point of the color gamut will either be reachable by both devices, by none of them, or partially by only one of the devices. In order to ensure full compatibility between a proof print produced by a printer and the corresponding final result obtained by a press, all color points present in the print should be part of both the color gamut of the printer and of the color gamut of the printing press. Ideally every color reference present in the proof print should be checked for being part of the color gamut of the printing press to be used.

PRIOR ART

In practice, the process used is the following: if a customer wants a large number of a particular image, a data file is provided. The data may be represented in a large variety of formats, including PDF, PostScript, TIFF, Jpeg, etc. The data file is then transformed into a form which may be directly processed by a printer, resulting typically in a bit map or in a rasterized representation. This processing is normally called rastering. During this process, a series of color patches is added to the image. This series of color patches consists of a series of colors which are representative of a known color space. For example, if the color space is the CMYK color space (Cyan Magenta Yellow black), such a series would typically include patches for 100% cyan, 100% magenta, 100% yellow, 100% black, 50% cyan, 50% magenta, etc..... A typical series of color patches is represented in FIG. 2, whereby the series of FIG. 2 comprises a plurality of square color patches disposed in two lines. The aim of including the color patches series is to get a normalized representation of the transformations that are required to emulate the color gamut of the press. The image is then printed together with the color patches series. By printing the color patched series, one gets a representation of what in the set of transformations applied by the printer results for example for the 100% cyan color value. Such a printed color patch of 100% cyan may be compared to the same 100% cyan patch produced by the printing press of interest, and to the original in the data file. If the differences between patches are acceptable, it means that the printer emulation for the "cyan 100%" point in the color gamut is representative of how the press reproduces the same color value. If this is true for all color patches of the series, it is assumed that the print produced by the printer is representative of what would be obtained by the printing press, and the print may be considered as valid proof print. If this is not the case, the image, together with the color patches series, in its electronic form, are modified in order to bring the differences between the printer printed color patches series and the color patches series of a standard printing press within a threshold of acceptability. Hence, up to the point where a valid proof print is obtained. It should be noted that all modifications are made both to the image and to the color patches series, and that the modifications typically consist in applying transformations to virtually modify how the transformations in the printer color gamut are done to emulate the press. The transformations may produce a virtual printer color gamut (included into the achievable one for the printer) which is closer to the color gamut of the printing press. The transformations may for example result in having a print of the 100% cyan patch made using 95% cyan, 3% yellow and 2% magenta, because such a printer produced 95% cyan, 3% yellow and 2% magenta color patch would correspond to the 100% cyan produced by the printing press. Such a transformation, because it also applies at the same time to the image, means that any 100% cyan part of the image would also be printed using 95% cyan, 3% yellow and 2% magenta. At the end of the process, it is assumed that the image may also be produced by the printing press, and therefore may be used as a validated proof print. This process is a time consuming and costly process which is realized by highly skilled specialized individuals. The object of this invention is to simplify this process.

SUMMARY OF THE INVENTION

This object is achieved in a first aspect of the invention by a method of producing a validated print-out comprising:

a- providing a printing apparatus comprising a memory, a processor, a printhead and a spectrophotometer;

b- loading an original virtual image data into the memory;

c- creating a modified virtual image which comprising the data from the original virtual image and a virtual original series of color patches representative of a color gamut, the modified virtual image being in the form of raster data;

d- provide a print-out of the modified virtual image on a media using the printing apparatus to obtain a printed image comprising a printed series of the color patches representative of the color gamut;

e- scanning the printed series of the color patches representative of the color gamut using the spectrophotometer to provide a spectrophotometer output;

f- analyzing the output using the processor to compare the output to an admissible range stored in the memory;

g- if the output is within the admissible range, validate the print-out of the modified virtual image, and, if the output is outside of the admissible range, either validate the print-out of the modified virtual image after an analysis of the position of the data points of the modified virtual image in relation to an admissible color gamut, or change the modified virtual image and repeat steps d- to g- until validation of a print-out of a modified virtual image.

The method according to the invention is a fully automated method which allows the production of a validated proof print rapidly and objectively.

According to the method, a validated print-out is produced. By validated, it should be understood that the print-out was validated according to step g- of the method. In an embodiment, the validated print-out is suitable for use as a proof print for press printing. The print-out is typically a piece of media on which a graphical image was printed. The media used is typically a sheet of paper, which may be a laminate, and may also be or comprise plastic resins or textile fibers, woven or non woven. The media is typically laminar, but may have a variety of shapes, for example packages such as bottles or boxes and the like. The media is typically flexible such as a sheet of paper but may also be rigid, such as card board or wood. The media may be provided in the form of a roll.

According to the method, a printing apparatus is provided. A printing apparatus may be one of different types of apparatuses including but not limited to one of the following: piezo ink jet printer, thermal ink jet printer, fax machine, multi function printer, photocopier, etc. . . . . . In a preferred embodiment, the printing apparatus is a large format printer. By large format, it should be understood that it is suitable for printing on a laminar media having a width of more than 21 cm (A4 width) or of more than the width of a US A size.

According to the method, the printing apparatus comprises a memory and a processor. It should be noted that the printing apparatus may comprise several processors and/or several memories. In an embodiment, the printing apparatus includes a computer in addition to a printer. In another embodiment, the printing apparatus comprises a printer, whereby the printer includes the memory and the processor. Typically, the memory includes data, the data including for example software. In an embodiment, the printing apparatus includes a communication port, the communication port providing a two way access to a network.

According to the method, the printing apparatus comprises a printhead. In an embodiment, the printhead is a thermal ink jet printhead. In another embodiment, the print head is a piezo ink jet print head. In an embodiment, the printhead comprises at least 1000 nozzles. In an embodiment, the printing apparatus comprises a plurality of printheads. Typically, the printhead may also be called pen. In an embodiment, the printhead comprises a plurality of printheads, whereby at least one printheads is printing in a color different from the color printed by another printhead. A printhead is typically a coherent group of nozzles, the group of nozzles normally forming an array, all nozzles of a printhead printing in the same color. In an embodiment, a printhead block is provided, the printhead block including a plurality of printheads, the printheads of the printhead block being integrated in a single mechanical piece. In an embodiment, the printheads of the printblock are piezo ink jet printheads. In another embodiment, the printing apparatus comprises a plurality of printheads, the printheads being mechanically separated. In another embodiment, the mechanically separated printheads are thermal ink jet disposable printheads. In an embodiment, the printhead is mobile. In an embodiment, the printhead is mobile in a rectilinear direction. In an embodiment, the printhead is mobile in a rectilinear direction, the printhead carrying a plurality of nozzles forming an array extending in a first direction and in a second direction, the first direction being parallel to the rectilinear direction and the second direction being perpendicular to the first direction. In another embodiment, the printhead is mobile in a rectilinear direction, the printhead being suitable for printing when moving in both senses of the rectilinear direction. The rectilinear direction may also be called scan axis. The scan axis typically corresponds to the direction of the width of the media.

According to the method, the printing apparatus comprises a spectrophotometer. The spectrophotometer typically is an instrument providing an output in response to an optical input, whereby the output allows identifying the color of the optical input, thus allowing locating the color of the optical input in a color space. In an embodiment, the printing apparatus comprises a printer, the spectrophotometer being part of the printer. In an embodiment, the spectrophotometer is mobile along a scanning direction. In an embodiment, both the printhead and the spectrophotometer are mobile along the same scanning direction. In an embodiment, the mobile printhead is placed on a mobile carriage, the mobile spectrophotometer being placed on the same mobile carriage.

According to the method, an original virtual image is loaded into the memory. Loading may be provided by using a physical media such as a disk or may be provided using a communication port. The original image is referred to as virtual because it is in the form of optical, electronic or magnetic data, rather than being an actual image. A virtual image should be understood as being the representation of an image in the form of printable data. The original virtual image may be provided using a number of formats including, but not limited to, the following: PDF, PostScript, TIFF, JPEG, PCL, etc.

According to the method, a modified virtual image is created which comprising the data from the original virtual image and a virtual original series of color patches representative of a color gamut, the modified virtual image being in the form of raster data. In an embodiment, the virtual original series of color patches is comprised in the original virtual image. In another embodiment, the virtual original series of color patches is not part of the original virtual image, the virtual original series of color patches being electronically added to the original virtual image as part of the process of generating the modified virtual image. In an embodiment, the virtual original series of color patches is a two-dimensional array. In an embodiment, the virtual original series of color patches comprises patches characteristic of a specific color space referential. The modified virtual image is in the form of raster data. Raster data should be understood as a type of data which may be directly processed by a printing engine. Example of raster data include bitmap or vector map. A color gamut corresponds to a particular group of colors in a color space. For example, if a printer is only provided with black ink, the printer will have a printer color gamut formed of a range of grey colors. In an embodiment according to the invention, the color gamut is a multicolor color gamut.

According to the method, a print-out of the modified image is provided on a media using the printing apparatus to obtain a printed image comprising a printed series of the color patches representative of the color gamut. According to the method, the printed series of the color patches representative of the color gamut is scanned using the spectrophotometer to provide a spectrophotometer output. Examples of spectrophotometer output are in the form of (L, a*, b*) data, CMYK data or RGB data. Such (L, a*, b*) data, CMYK data or RGB data are different manners to represent a color space. Other representations of the color space may be used. In an embodiment, the color gamut according to the invention has an envelope in the color space, whereby the virtual original series of color patches comprises color patches which are comprised in the envelope.

According to the method, an analysis of the output is provided using the processor to compare the output to an admissible range stored in the memory. In an embodiment, the admissible range is based on a print of the same virtual series of the color patches printed by a press. In an embodiment, the admissible range is based on a standard series of the color patches corresponding to a standard press type.

According to the method of the invention, if the output is within the admissible range, the print-out of the modified virtual image is validated. If the output is outside of the admissible range, there are two possibilities. The first possibility comprises validating the print-out of the modified virtual image after an analysis of the position of the data points of the modified virtual image in relation to an admissible color gamut. The second possibility comprises changing the modified virtual image and repeat steps d- to g- until validation of a print-out of a modified virtual image. The changing of the modified image results in another modified image. The aim in changing is to apply a transformation to the complete set of data representing the modified image in order to build another modified image having a different set of data. The transformation is typically a slight color shift which aims at slightly changing the aspect of the printed color patches of the series in order to bring them closer to the admissible range. For example, if a printed color patch is found as being a little too cyan than the admissible range for that particular color patch, the cyan component of the color patch is slightly lowered and compensated by other basic colors. In an embodiment, the change takes former method realizations, if available, into account, in order to reduce the number of iterations required to obtain a validated print out.

In an embodiment of the method of the invention the admissible range is representative of a printing press color gamut.

In an embodiment of the method of the invention, the memory comprises a plurality of admissible ranges, whereby one particular admissible range of the plurality is selected for realizing the method. This could allow a user to choose to obtain a proof print suitable for a specific press of for a specific press standard.

In an embodiment of the method of the invention, the change of the modified virtual image of step g is made by preserving the perceptual properties. In an embodiment, the preservation of perceptual properties is obtained by preserving the hue. In the (L, a*, b*) color space, preserving the hue could in some instances imply changing the L value of the color while maintaining the "a*" and "b*" values constant. In other instances, the hue may be preserved by changing not only the L value, but also the "a*" and "b*" values. In an embodiment, the preservation of perceptual properties is obtained by preserving the tone of the color while modifying its intensity. In an embodiment, the preservation of perceptual properties is obtained by either reinforcing or fading the color. In an embodiment, the preservation of perceptual properties is obtained by a "hue-preserving minimum delta-E" algorithm. In an embodiment, the preservation of perceptual properties is obtained by a "SGCK" algorithm. Both these algorithms are described in "CIE 156:2004—Guidelines for the Evaluation of Gamut Mapping Algorithms", published in 2004 by the CIE—Commission Internationale de l'Eclairage.

In an embodiment of the method of the invention, an analysis of the position of the data points of the modified virtual image in relation to an admissible color gamut is always provided if the output is outside of the admissible range. This measure would add flexibility to the method. It should be noted that the method is primarily based on the analysis of color patches which characterize a specific gamut. There may be cases where the printed color patches are within the admissible range while a number of point or zones of the printed image are not part of the gamut corresponding to the admissible range. There may also be cases where some of the printed color patches are outside of the admissible range while all points or zones of the printed image are within the gamut corresponding to the admissible range. This implies that a complete an unequivocal result may only be obtained by analyzing the position of the data points of the original modified image in relation to an admissible color gamut. For example, if an image comprises only a reduced amount of color points located in a region of the color space which is not into the admissible color gamut, the print out may be validated even if one or more patches of the printed series are not within the admissible range. For example, if all color patches of the printed series are within admissible range except for a 100% yellow patch, and if the actual modified virtual image comprises none or a little amount only of yellow data points, the print out may be validated.

A particular printer gamut 100 is represented in the L, a*, b* color space in FIG. 1 by its meshed envelope. A particular press gamut 110 is represented in the same color space by its solid envelope. The envelope of the gamut represents the outer surface of the smallest volume of the color space which contains all points from the color space which may be printed by the apparatus concerned. As evidenced in FIG. 1, both gamuts 100 and 110 have an intersecting common volume. Gamut 100 also comprises zones which are outside of gamut 110, and gamut 110 comprises zones outside of gamut 100. The invention aims at producing a print using a printer having a gamut 100 as a proof print for the press having the gamut 110. Ideally, all color points of the color space used in the proof print should be part of the intersecting volume common to both gamuts 100 and 110.

In an embodiment, the analysis of the position of the data points of the original virtual image comprises a identification of the proportion of the data points situated outside of the admissible color gamut, comparing this proportion to a proportion threshold, whereby the print-out of the modified virtual image is validated if the proportion is below the threshold and whereby the modified virtual image is changed and the steps d- to g- repeated until validation of a modified virtual image if the proportion is above the threshold. In an embodiment, the proportion threshold is 1% of the data points, meaning that the print-out is validated if 1% or less than 1% of the points are situated in the color space outside of the admissible color gamut. In an embodiment, the proportion threshold is 2% of the data points. In an embodiment, the proportion threshold is 4% of the data points.

In an embodiment, the analysis of the position of the data points of the original virtual image comprises an identification of the shortest distance separating a data point of the modified virtual image in the color space situated outside of the admissible color gamut from the envelope of the admissible gamut, and comparing this distance to a threshold distance.

In an embodiment the output of the spectrophotometer is according to, but not limited to, one of the following standards: (L, a*, b), RGB or CMYK.

In an embodiment an extra operation takes place prior to changing the modified virtual image and repeating steps d- to g- until validation of a modified virtual image, the extra operation comprising repeating steps e and f. This extra operation would aim at checking the reading of the spectrometer. In an embodiment, if the extra operation is repeated more than once with inconsistent results, an operator is informed of the inconsistency. Such an inconsistency may be due to a malfunctioning spectrophotometer, or a variation in the measurement process that rends the read values not usable.

In an embodiment a further operation takes place prior to changing the modified virtual image and repeating steps d- to g- until validation of a modified virtual image, the further operation comprising identifying the most suitable media for a given proof. It should be noted that a particular admissible range depends of the media on which the color patches are produced. For example, if the admissible range comprises glossy colors, and if the media is not a glossy media, the media could be changed with the goal of producing a better proof, if changing the media is a valid alternative for the user. In an embodiment a further operation takes place prior to changing the modified virtual image and repeating steps d- to g- until validation of a modified virtual image, the further operation comprising identifying the media, the further operation comprising a request for media change if the media is inappropriate and can be changed.

In an embodiment, the printing apparatus comprises a media sensor. Such a media sensor may provide information related for example to the glossiness or to the thickness of the media. In an embodiment, the media sensor is an optical sensor. In an embodiment, the media sensor is mobile. In an embodiment, the media sensor is located on a carriage together with the printhead and the spectrophotometer.

In an embodiment, an identified media is evaluated in relation to the admissible range and in relation to the output, whereby the evaluation leads to a choice of either changing the type of media used or keeping the same type of media when repeating step d.

In an embodiment, the print-out comprises printing out of a first part of the modified virtual image, whereby the first part includes the printed series of the color patches representative of the color gamut, whereby steps e- to g- are realized prior to printing the remaining part of the modified virtual image. This would delay a full print of the full image until the validation is obtained, thus providing economies in time and ink consumption. In an embodiment, a complete print-out of the modified virtual image is produced only after a validation. In an embodiment, the series of color patches is located on the leading edge of the print out, this in order to print such a series first.

In an embodiment, the printhead and the spectrophotometer are mobile along a scan axis.

In a second aspect the invention relates to a printing apparatus comprising a memory, a processor, a printhead and a spectrophotometer, the printhead and the spectrophotometer being mobile along a scan axis, the printing apparatus further comprising software, the software causing the printing apparatus to operate according to the method according to any of the above claims.

DETAILED DESCRIPTION

Figure 1:
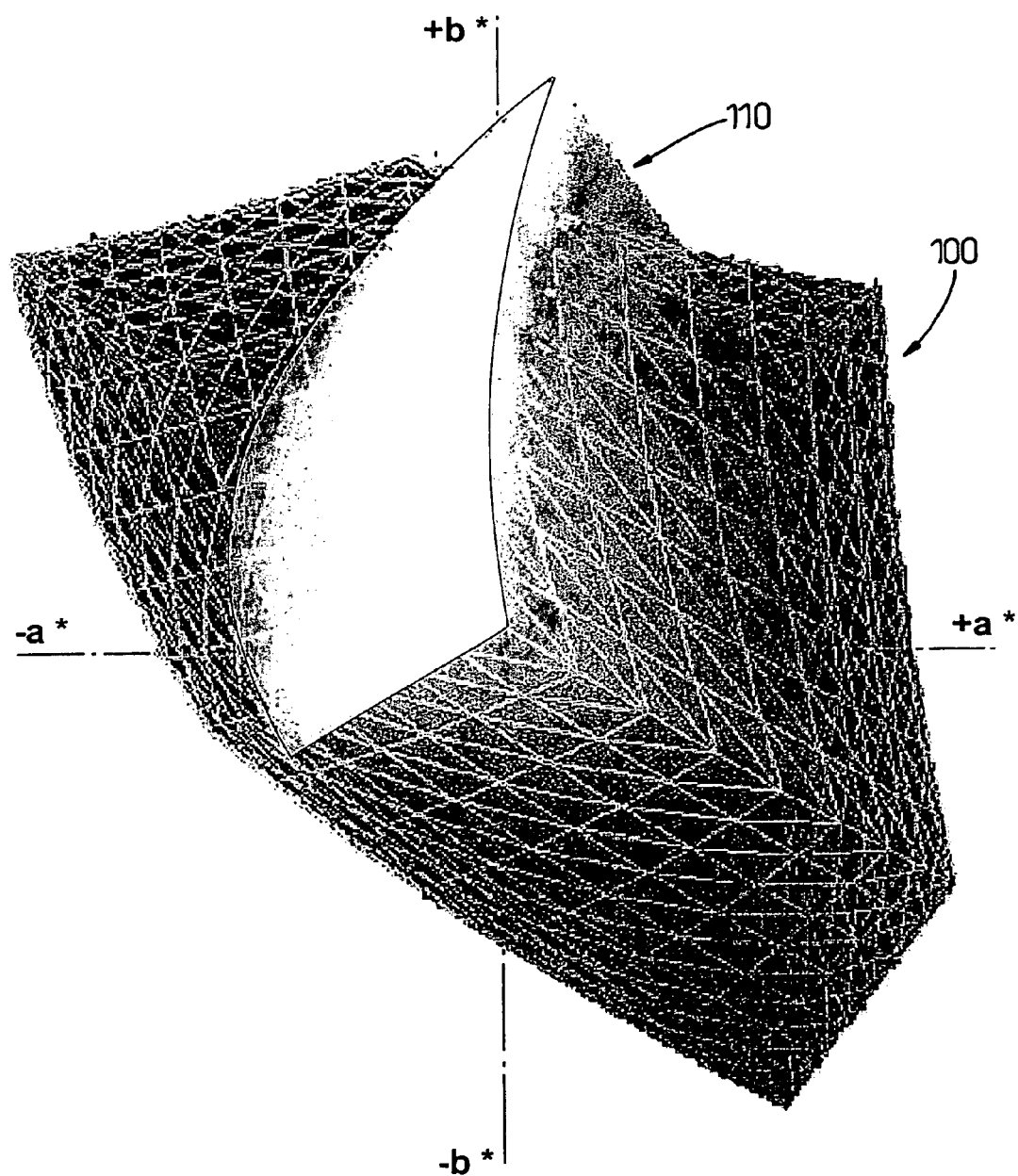
FIG. 1 is a representation of two different gamuts in a color space.
Figure 2:
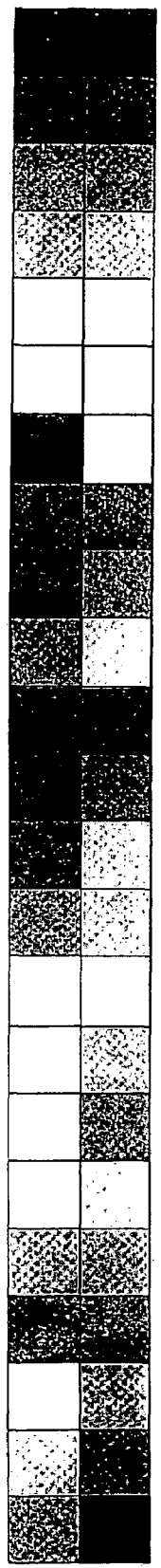
FIG. 2 is a representation of a series of color patches.
Figure 3:
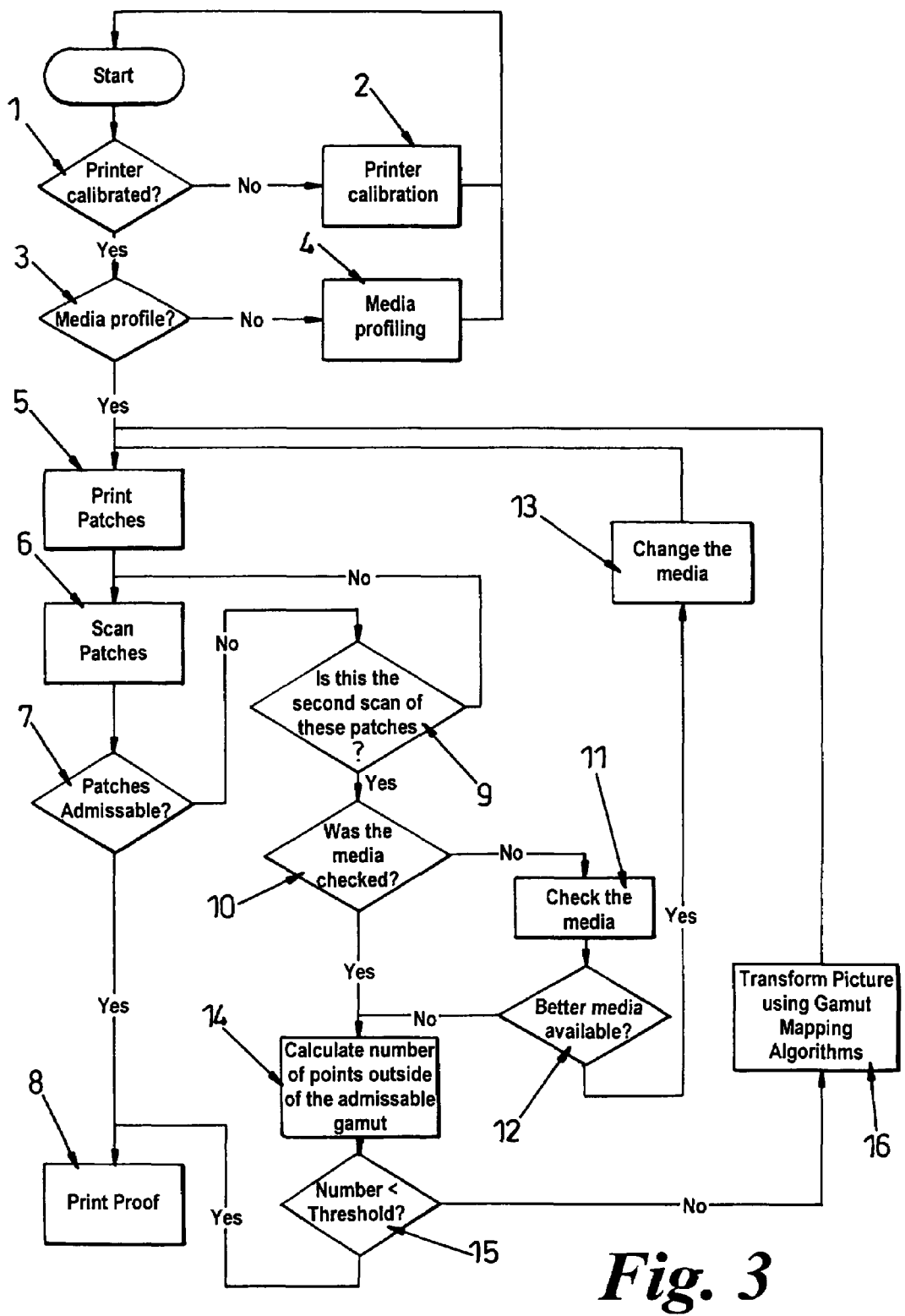
FIG. 3 illustrates an embodiment of the method according to the invention.

An embodiment according to the method of the invention is illustrated by the flow chart of FIG. 3, whereby it is assumed that the printing apparatus was already loaded with data representing an image, whereby a modified virtual image was created by adding a virtual color patches series as represented in FIG. 2. Data input is usually in the form of a data file in PDF, PostScript, PCL, TIFF, JPEG or any other digital image format suitable for printing. The system will transform that original data file into a printable one by following a given rasterizing and half toning process, on which a binary image file is produced with the goal of using a printing device to translate it on ink and paper. Once this modified virtual image was rasterized, a first step consist in this embodiment in checking 1 when the printing apparatus was calibrated last. The printing apparatus in this example is a large format printer comprising, for example, six printheads, each printhead containing a different ink, the six inks used being Cyan, Magenta, Yellow, Black, Light Magenta and Light Cyan. A threshold is defined, whereby a calibration 2 is automatically provided if the time since the last calibration is superior to the threshold. This is to ensure that the method will be realized using a calibrated printer. If the printer is calibrated, the media loaded into the printer is identified by a media sensor. In the embodiment, the media sensor is placed on a carriage, together with the printheads and the spectrophotometer. Once the media is identified, for example based on its glossiness or/and thickness, the method includes a step of checking 3 if there is a media profile. A media profile corresponds to the transformations that need to be applied to a device profile to end up with a single transformation that represents all printing conditions, and that is used with the input image to directly generate the output image. Normally the media profile is the part that characterizes a media to be used with a given device. If such a media profile is not provided, a default media profile may be provided. In an embodiment, the user is informed of the use of a default media profile since it may affect the overall quality of the process. Once the printer is calibrated and loaded with a profiled media, the printer prints 5 the series of color patches of the modified virtual image. In this embodiment the series of color patches are located in the modified virtual image in such a manner that it will be printed on the leading edge of the media, meaning on the edge of the media which exits first from the printer. At this stage, the printer only prints the series of color patches. The rest of the modified virtual image is not printed at this stage. Once this series of color patches is printed, it is scanned 6 by the spectrophotometer. The output of the spectrophotometer is analyzed 7 using a processor which is comprised in the printer, each printed color patch being compared to an admissible range provided in the printer memory, the admissible range corresponding to a specific press, or target press, on which the image should be printed at a later stage. If all color patches are found to be inside the admissible ranges, the print is finished 8 by the printer which produces a full proof print. If one or more color patches are found to be outside of the admissible range, the measurement using the spectrophotometer is made a second time 9 to increase the measurement accuracy. At this stage, if the two measurements are differing, an error message may be provided for checking the spectrophotometer. If the second measurement with the spectrophotometer leads to admissible results, the final proof print is produced. If the second spectrophotometer scan is again found to be inadmissible, there is a check 10 ensuring that the media was evaluated, meaning that the media used allows achieving the desired admissible ranges. It should indeed be noted that for example some specific colors may only be obtained using a certain type of media. If the media was not checked, the media is checked as suitable 11. If a better media should be used 12, the media is changed 13, and printing starts again. If the media used is the best media available, or if the media was already checked as being suitable, the position of each color point of the modified virtual image is considered 14 for inclusion, or not, into the gamut of the target press. If the number of points situated outside is below the threshold 15, for example 1%, the proof print is produced 8. If the number of points of the modified virtual image located outside of the target press gamut is above the threshold, when the modified virtual image is transformed 16 with a gamut mapping algorithm, for example to respect hue. The amount of color references that were placed out of the emulated gamut may be indicated to the user as an indication of how much out/of/gamut translations where required. The method is iterated with a new modified virtual image, until a validated print proof is obtained. There may be a limit to the number of iterations in order to avoid getting into an endless loop. In this case, the user may choose for example either to change printer, or change press, or change the thresholds being parts of the process in order to obtain a print proof. In this embodiment, a complete print by the printer only occurs at a stage where the print is validated.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. Method of producing a validated print-out comprising:
   (a) providing a printing apparatus comprising a memory, a processor, a printhead and a spectrophotometer, the printhead and the spectrophotometer being mobile along a scan axis;
   (b) loading an original virtual image data into the memory;
   (c) creating a modified virtual image which comprising the data from the original virtual image and a virtual original series of color patches representative of a color gamut, the modified virtual image being in the form of raster data;
   (d) provide a print-out of the modified virtual image on a media using the printing apparatus to obtain a printed image comprising a printed series of the color patches representative of the color gamut;
   (e) scanning the printed series of the color patches representative of the color gamut using the spectrophotometer to provide a spectrophotometer output;
   (f) analyzing the output using the processor to compare the output to an admissible range stored in the memory;
   (g) if the output is within the admissible range, validate the print-out of the modified virtual image, and, if the output is outside of the admissible range, either validate the print-out of the modified virtual image after an analysis of the position of the data points of the modified virtual image in relation to an admissible color gamut, or change the modified virtual image and repeat steps (d) to (g) until validation of a print-out of a modified virtual image,
   wherein the analysis of the position of the data points of the original virtual image comprises an identification of the proportion of the data points situated outside of the admissible color gamut, comparing the proportion to a proportion threshold, wherein the print-out of the modified virtual image is validated if the proportion is below the threshold and wherein the modified virtual image is changed and the steps (d) to (g) repeated until validation of a modified virtual image if the proportion is above the threshold.

2. A method according to claim 1, whereby the admissible range is representative of a printing press color gamut.

3. A method according to claim 1, whereby the memory comprises a plurality of admissible ranges, whereby one particular admissible range of the plurality is selected for realizing the method.

4. A method according to claim 1, whereby the change of the modified virtual image of step g is made by preserving the perceptual properties.

5. A method according to claim 1, whereby an analysis of the position of the data points of the modified virtual image in relation to an admissible color gamut is always provided if the output is outside of the admissible range.

6. A method according to claim 1, whereby the output is according to one of the following standards: (L, a*, b*), RGB or CMYK.

7. A method according to claim 1, whereby an extra operation takes place prior to changing the modified virtual image and repeating steps (d) to (g) until validation of a modified virtual image, the extra operation comprising repeating steps (e) and (f).

8. A method according to claim 1, whereby a further operation takes place prior to changing the modified virtual image and repeating steps (d) to (g) until validation of a modified virtual image, the further operation comprising identifying the media.

9. A method according to claim 8, whereby the identified media is evaluated in relation to the admissible range and in relation to the output, and whereby the evaluation leads to a choice of either changing the type of media used or keeping the same type of media when repeating step (d).

10. A method according to claim 1, whereby the printing apparatus comprises a media sensor.

11. A method according to claim 10, whereby the identified media is evaluated in relation to the admissible range and in relation to the output, and whereby the evaluation leads to a choice of either changing the type of media used or keeping the same type of media when repeating step (d).

12. A method according to claim 1, whereby the print-out comprises printing out of a first part of the modified virtual image, whereby the first part includes the printed series of the color patches representative of the color gamut, whereby steps (e) to (g) are realized prior to printing the remaining part of the modified virtual image.

13. A method according to claim 12, whereby a complete print-out of the modified virtual image is produced only after a validation.

14. A method according claim 1, whereby the printhead and the spectrophotometer are mobile along a scan axis.

15. A printing apparatus comprising a memory, a processor, a printhead and a spectrophotometer, the printhead and the spectrophotometer being mobile along a scan axis, the printing apparatus further comprising a computer readable medium embedding a program, the program when executed by the processor, causing the printer apparatus to perform the steps of:
 (b) loading an original virtual image data into the memory;
 (c) creating a modified virtual image which comprising the data from the original virtual image and a virtual original series of color patches representative of a color gamut, the modified virtual image being in the form of raster data;
 (d) provide a print-out of the modified virtual image on a media using the printing apparatus to obtain a printed image comprising a printed series of the color patches representative of the color gamut;
 (e) scanning the printed series of the color patches representative of the color gamut using the spectrophotometer to provide a spectrophotometer output;
 (f) analyzing the output using the processor to compare the output to an admissible range stored in the memory;
 (g) if the output is within the admissible range, validate the print-out of the modified virtual image, and, if the output is outside of the admissible range, either validate the print-out of the modified virtual image after an analysis of the position of the data points of the modified virtual image in relation to an admissible color gamut, or change the modified virtual image and repeat steps (d) to (g) until validation of a print-out of a modified virtual image,
 wherein the analysis of the position of the data points of the original virtual image comprises an identification of the proportion of the data points situated outside of the admissible color gamut, comparing the proportion to a proportion threshold, wherein the print-out of the modified virtual image is validated if the proportion is below the threshold and wherein the modified virtual image is changed and the steps (d) to (g) repeated until validation of a modified virtual image if the proportion is above the threshold.

16. A printing apparatus according to claim 15, whereby the program causes the printing apparatus to operate such that the print-out comprises printing out of a first part of the modified virtual image, wherein the first part includes the printed series of the color patches representative of the color gamut, wherein steps (e) to (g) are realized prior to printing the remaining part of the modified virtual image.

17. A printing apparatus according to claim 15, whereby the printing apparatus comprises a media sensor.

18. A computer readable embedding a program, which when executed causing a printing apparatus to perform steps, the printing apparatus comprising a memory, a processor, a printhead and a spectrophotometer, the printhead and the spectrophotometer being mobile along a scan axis, the steps comprising:
 (b) loading an original virtual image data into the memory;
 (c) creating a modified virtual image which comprising the data from the original virtual image and a virtual original series of color patches representative of a color gamut, the modified virtual image being in the form of raster data;
 (d) provide a print-out of the modified virtual image on a media using the printing apparatus to obtain a printed image comprising a printed series of the color patches representative of the color gamut;
 (e) scanning the printed series of the color patches representative of the color gamut using the spectrophotometer to provide a spectrophotometer output;
 (f) analyzing the output using the processor to compare the output to an admissible range stored in the memory;
 (g) if the output is within the admissible range, validate the print-out of the modified virtual image, and, if the output is outside of the admissible range, either validate the print-out of the modified virtual image after an analysis of the position of the data points of the modified virtual image in relation to an admissible color gamut, or change the modified virtual image and repeat steps (d) to (g) until validation of a print-out of a modified virtual image,
 wherein the analysis of the position of the data points of the original virtual image comprises an identification of the proportion of the data points situated outside of the admissible color gamut, comparing the proportion to a proportion threshold, wherein the print-out of the modified virtual image is validated if the proportion is below the threshold and wherein the modified virtual image is changed and the steps (d) to (g) repeated until validation of a modified virtual image if the proportion is above the threshold.

19. A computer readable medium according to claim 18, whereby the program causes the printing apparatus to operate such that the print-out comprises printing out of a first part of the modified virtual image, whereby the first part includes the printed series of the color patches representative of the color gamut, whereby steps (e) to (g) are realized prior to printing the remaining part of the modified virtual image.

* * * * *